United States Patent Office 2,878,133
Patented Mar. 17, 1959

2,878,133

COMPOSITION FOR INSULATING COVERING

Augusto Uccelli, Como, Italy

No Drawing. Application February 14, 1956
Serial No. 565,316

Claims priority, application Switzerland February 17, 1955

1 Claim. (Cl. 106—87)

The present invention relates to a method of producing a rendering or insulating covering designed in particular for parts of buildings, such as walls, floors, ceilings and so forth. Said covering contains, as an essential component, asbestos fibers. The heat and sound insulating properties of asbestos have already been used to advantage in known coverings of this sort. The present invention aims at a further improvement of such coverings.

The method used in the production of a rendering or insulating covering according to the invention is that asbestos fibers, cement and pulverized and activated bentonite are blended to form a dry mix which, immediately before use, is stirred with water into a paste which is applied to the desired place as a covering and allowed to dry. Activated bentonite consists of bentonite having about 2 to 5% sodium carbonate incorporated therein.

The mix will suitably contain 30–80 parts by weight of asbestos fibers, 10–70 parts by weight of cement and 5–30 parts by weight of bentonite. According to whether more asbestos fibers or more cement is added, a covering can be obtained which is more suitable either for insulating purposes or as a rendering, although even in the latter case the covering has heat insulating properties.

If it is desired to produce a covering suitable as a rendering, white cement can be used to advantage in the dry mixture and it will give the covering a light color. If required, the rendering covering can also be colored as desired by the addition of oxide pigments. If the covering is only intended to be used as insulation, ordinary, so-called black cement can be employed just as well.

Several embodiments of the method according to the invention will now be described in detail.

In order to produce a covering suitable in particular as a rendering, 60 parts by weight of white cement, 40 parts by weight of short asbestos fibers and 10 parts by weight of pulverized and activated bentonite are first thoroughly mixed together in a mixing drum. The mix is then poured into bags, as is the usual practice with cement. Bentonite is an exchangeable, generally plastic clay which contains chiefly montmorillonite $(Al_2(OH_2)Si_4O_{10})$ an amorphous-looking mineral, the fine structure of which results in a great absorptive power.

Immediately before use the aforesaid dry mix is stirred with water into a paste, the consistency of the latter being made such that it can be applied at the desired point as a covering with, for instance, a trowel, spray or broom, either by hand or with a machine suitable for the purpose. In order to ensure that the covering will adhere properly to the base, the latter must be cleaned beforehand. Finally, the applied covering can be allowed to set and dry in the air. Should the covering have a relatively large thickness of several millimetres, it is advantageous to produce it in several operations by applying several relatively thin layers one after the other, each preceding layer being allowed to dry before the following one is applied to it.

The covering obtained by the method described above is practically white owing to the use of white cement. If the covering is applied with the trowel in several operations, it will be virtually free from pores and is barely hygroscopic, for which reason it is particularly suitable for the rendering of the outer walls of buildings, although it can also be used for internal rendering.

The coating can be given any desired color by adding appropriate oxide pigments to the paste. If the paste is of suitable consistency, it will have plastic properties which enable it to be given any desired surface configuration for the purpose of achieving ornamental effects.

The finished covering forms a good thermal insulation and is therefore particularly advantageous as a rendering for buildings in comparatively cold or comparatively warm regions. Differences in temperature do not cause any change in the rendering.

If it is desired to produce a covering intended to be used in particular as an internal rendering in rooms with a strongly fluctuating moisture content, the procedure is as follows:

50 parts by weight of white cement, 50 parts by weight of asbestos fibers, 15 parts by weight of hydraulic lime and 10 parts by weight of bentonite are thoroughly mixed together in a mixing drum to form a dry mix which can then be poured into bags. Before use, this mix is stirred with water into a paste which can be applied to the wall with a stucco machine or a spray nozzle. Application with the trowel is not to be recommended. After the paste has set and dried, the result is a covering which is relatively highly hygroscopic. If the atmosphere is moist, the covering is capable of absorbing water, distributing it evenly within itself and subsequently, when the atmosphere has become drier, of returning it to the latter. The covering described has, therefore, the property of exercising a considerable compensating action on the moisture content of the surrounding atmosphere, which is of great advantage particularly for inside rooms such as kitchens, bathrooms, laundry rooms, laboratories and so on. Virtually no condensed water can occur on the covering. Despite the absorption of water, the inner structure of the covering is in no way altered. Its inorganic composition prevents the covering from rotting.

The hygroscopic covering should not be colored.

If the composition of the dry mix is changed slightly, coverings can be produced which have considerably greater properties of insulation.

If, by way of example, 75 parts by weight of asbestos fibers, 15 parts by weight of white cement and 10 parts by weight of bentonite are mixed together into a dry mix, it is possible, by stirring the latter with water, to obtain a paste which is excellently suited for the production of a sound-absorbent covering. The paste is preferably applied with a stucco machine or a spray gun so that it is compressed as little as possible. The covering can be used to coat walls, floors and ceilings, particularly in halls, theatres, cinemas, sound recording studios, churches and so forth, in order to prevent the occurrence of disturbing echos. The sound absorptive power of the covering described is so good that even in the most unfavorable architectural conditions the desired freedom from echo can be achieved. This covering is also suitable as an acoustics corrector.

This covering, too, can be given any desired color by the addition of oxide or mineral pigments.

If the dry mix is made from 75 parts by weight of asbestos fibers, 15 parts by weight of cement and 15 parts by weight of bentonite, the result, after stirring with water and drying, will be a covering which provides a definitely high degree of heat insulation. This covering is therefore especially suitable for floors, ceilings and terraces. As the covering generally receives a further coat of some other material, and is thus concealed from sight, its color is unimportant. The cheaper black cement, that is to say, ordinary cement, can therefore be used.

If the same dry mix is stirred into a paste not with water but with a mixture of 14 parts by weight of water and one part by weight of hydrogen peroxide ($H_2O_2$), the result is a covering which is relatively highly porous. This increased porosity gives the covering, in addition to the heat insulation power described above, a particularly pronounced sound and vibration insulating power. The covering is therefore particularly suitable e. g. for floors and ceilings, for the purpose of keeping, for instance, the vibration of machines away from parts of buildings or, in multi-story buildings, for the purpose of protecting the lower rooms from the sound of footsteps, and so forth coming from the upper rooms.

The individual constituents may of course also be combined in proportions other than those described. The dry mix may contain 30–80 parts by weight of asbestos fibers, 10–70 parts by weight of cement and 5–30 parts by weight of bentonite. All the coverings thus produced are non-inflammable.

It can be seen from the preceding description that the coverings are composed entirely of inorganic substances. Known similar coverings also contain, in part, organic substances, e. g. in colloidal form, and can therefore not have the same durability as the coverings described in the foregoing.

Having now particularly described and ascertained the nature of my said invention and in what manner the same is to be performed, I declare that what I claim is:

A composition of matter for use in the production of an insulating covering, comprising a paste consisting essentially of a dry mix of from 30 to 80 parts by weight of asbestos fibres, from 10 to 70 parts by weight of hydraulic cement, and from 5 to 30 parts by weight of bentonite activated with from 2 to 5% sodium carbonate, said dry mix being placed and stirred in a solution of hydrogen peroxide and water to form said paste, with said hydrogen peroxide and water being present in the ratio of about 1 part by weight of hydrogen peroxide to 14 parts by weight of water.

References Cited in the file of this patent

UNITED STATES PATENTS

| Number | Name | Date |
|---|---|---|
| Re. 19,506 | New | Mar. 19, 1935 |
| 772,181 | Scott | Oct. 11, 1904 |
| 1,418,160 | Patee | May 30, 1922 |
| 1,580,787 | Lanhoffer | Apr. 13, 1926 |
| 1,933,271 | Leun et al. | Oct. 31, 1933 |
| 1,961,525 | Offutt | June 5, 1934 |
| 2,024,791 | Munich et al. | Dec. 17, 1935 |
| 2,123,028 | Vogel-Jorgensen | July 5, 1938 |
| 2,198,800 | Badollet | Apr. 30, 1940 |
| 2,259,134 | Heineman | Oct. 14, 1941 |
| 2,334,694 | Batcheller | Nov. 23, 1943 |

FOREIGN PATENTS

| 141,021 | Australia | May 1, 1951 |